(12) United States Patent
Rekimoto

(10) Patent No.: US 6,556,185 B2
(45) Date of Patent: Apr. 29, 2003

(54) INFORMATION PROCESSING DEVICE AND METHOD

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/925,917

(22) Filed: Aug. 9, 2001

(65) Prior Publication Data

US 2002/0075335 A1 Jun. 20, 2002

Related U.S. Application Data

(63) Continuation of application No. 08/902,389, filed on Jul. 29, 1997.

(30) Foreign Application Priority Data

Aug. 5, 1996 (JP) .................................. 08-205610

(51) Int. Cl.[7] .................. G09G 5/08; G09G 5/00
(52) U.S. Cl. ...................... 345/157; 345/169
(58) Field of Search .................. 345/156, 157, 345/158, 169, 173, 174

(56) References Cited

U.S. PATENT DOCUMENTS 5,453,758 A * 9/1995 Sato ........................ 345/158
5,602,566 A * 2/1997 Motosyuku et al. ....... 345/156
6,067,082 A * 5/2000 Enmei ..................... 345/169

* cited by examiner

Primary Examiner—Vijay Shankar
(74) Attorney, Agent, or Firm—Bell, Boyd & Lloyd LLC

(57) ABSTRACT

In an information processing device, when an operation button is pushed, a menu is displayed on the screen of an LCD. When the whole portable type information processing device (PDA) is rotated around the X-axis, the Y-axis or the Z-axis with the operation button being pushed, the rotation is detected by a triaxial gyro sensor, and on the basis of the detection result a cursor displayed on the screen is moved on the menu. By releasing the operation button when the cursor is located on a desired menu item, the selection of the menu item at which the cursor is located is settled, and the processing corresponding to the selected menu item is started.

13 Claims, 13 Drawing Sheets

INFORMATION PROCESSING DEVICE AND METHOD

This application is a continuation of U.S. patent application Ser. No. 08/902,389 filed on Jul. 29, 1997.

BACKGROUND OF THE INVENTION

The present invention relates to information processing device and method for inputting information by holding and rotating the overall device with a hand.

In a portable information equipment such as an electronic pocket notebook, a pocket telephone, a pocket beeper or the like, a button, a pen, a touch panel or the like has been conventionally used as information input means. For example, in the electronic pocket notebook, the body of the equipment is held by a hand while a pen is held by the other hand, and a touch panel which is provided to the equipment body is operated with the pen to input prescribed information.

Further, in the pocket telephone, numeral keys for inputting a telephone number and functional buttons corresponding to the respective functions are provided to perform prescribed operations. In the pocket beeper or the like, an indispensable minimum number of functional buttons corresponding to the respective functions are provided, and these buttons are operated.

However, in the case of a portable information equipment such as a electronic pocket notebook for inputting information by using a pen and a touch panel, the equipment body provided with the touch panel must be held by one hand while the pen is held by the other hand, and thus both the hands must be used for the operation. Therefore, it has a problem that the operability thereof is bad in some cases. For example, it is difficult to operate the portable equipment while a baggage is held by one hand.

The pocket telephone, etc. have a problem that the numeral keys for inputting a telephone number occupies a large space, and thus it obstructs a compact design.

SUMMARY OF THE INVENTION

The present invention has been implemented in view of such a situation, and has an object to provide an information processing device which can reduce the number of operation buttons and can be readily handled even by one hand.

In order to attain the above object, an information processing device as claimed in claim 1 comprises display means which is provided in a portable-size housing and adapted to display information, detection means which is provided in the housing and adapted to detect the displacement of the attitude of the housing due to rotation of the whole housing, instructing means which is provided, and operated when display of selection information on the display means is instructed and when desired information is selected from the displayed selection information, and processing means which is provided in the housing, and adapted to displaying on the display means the selection information corresponding to the displacement detected by the detection means in accordance with the operation of the instructing means, and performing the processing relating to the selection information which is selected from the selection information displayed on the display means by the instructing means.

Further, an information processing method for use in an information processing device comprising a portable-sized housing, and display means for displaying information, detection means for detecting the displacement of the attitude of said housing due to rotation of the whole housing and instructing means for performing predetermined instructions which are provided in the housing, comprises the steps of displaying on the display means the selection information corresponding to the displacement detected by the detection means, and when desired information is selected from the selection information displayed on the display means by the operation of the instructing means, performing the processing relating to the selected selection information.

DETAILED DESCRIPTION OF THE PREFERRED EMBODIMENT

A preferred embodiment according to the present invention will be described with reference to the accompanying drawings.

Figure 1:
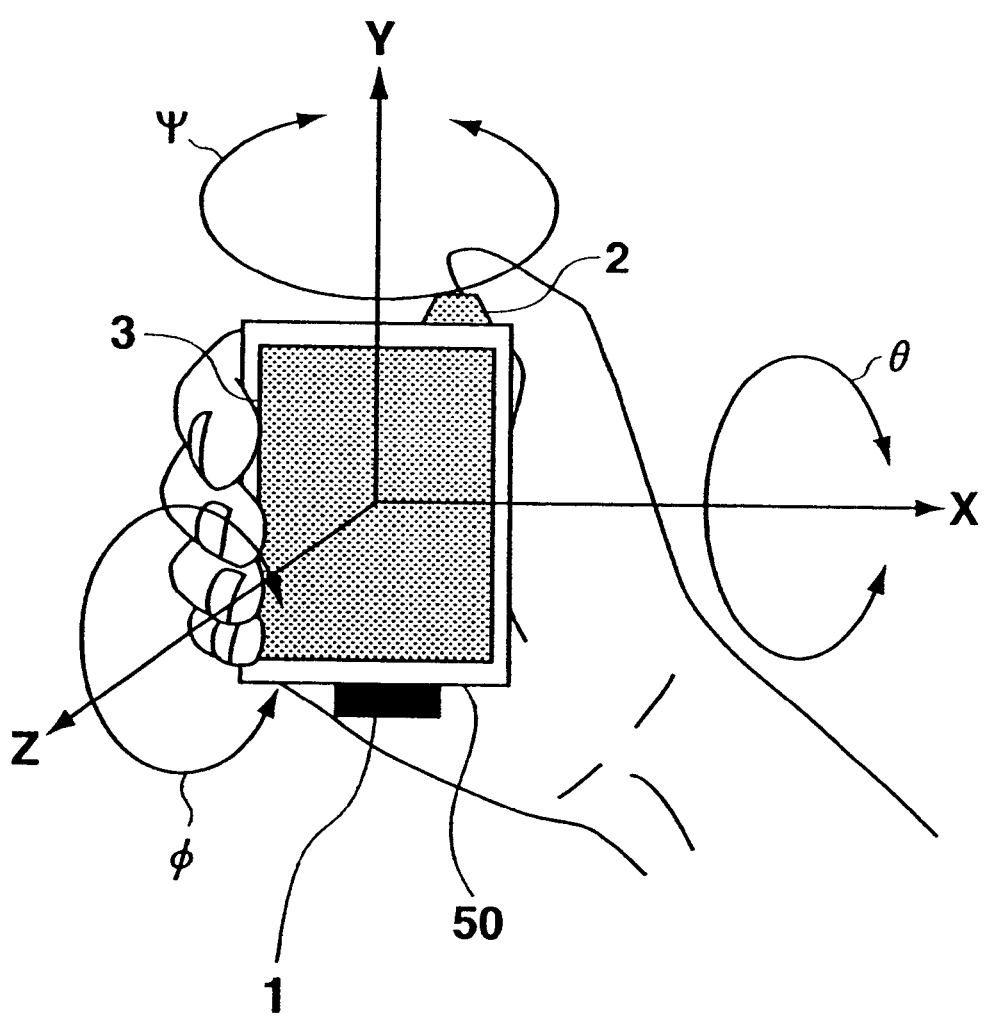
FIG. 1 is a diagram showing the outlook of a portable type information processing device to which an input device of the present invention is applied.

FIG. 1 is a diagram showing the outlook of a portable information processing device (PDA: personal digital assistants) 50 to which the present invention is applied. A triaxial gyro sensor 1 (detection means) 1 detects each rotational angle when the whole device is rotated around the X-axis, the Y-axis and the Z-axis. An operation button 2 (instructing means) is designed to make a predetermined instruction to the device. An LCD 3 (display means) is designed to display images such as a menu frame, a map, etc.

Figure 2:
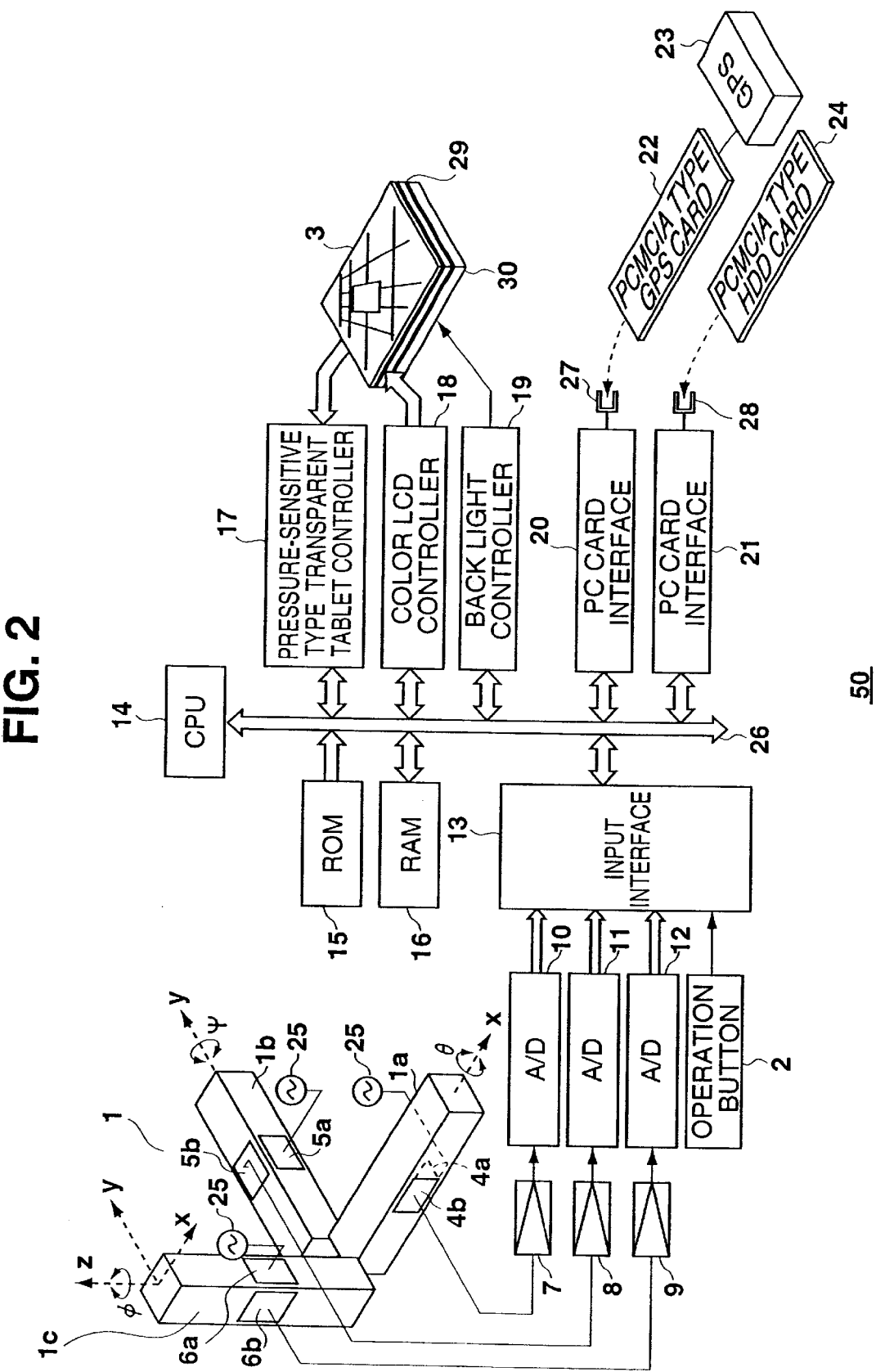
FIG. 2 is a block diagram showing the internal construction of the portable type information processing device shown in FIG. 1.

FIG. 2 is a block diagram showing the construction of the inside of the PDA 50 shown in FIG. 1. The triaxial gyro sensor 1 comprises vibrational gyros 1a, 1b and 1c which correspond to the respective coordinate axes of the X-axis, the Y-axis and the Z-axis.

The vibrational gyro has such a characteristic that when a rotational angular velocity is applied to a vibrating object, Coriolis force occurs in the direction perpendicular to the vibration direction, and the Coriolis force F is represented as follows.

$$F=2mv\omega$$

(m represents mass, v represents velocity and ω represents angular velocity)

Accordingly, the angular velocity ω is proportional to the Coriolis force F, and thus the rotational angular velocity can be detected by detecting the Coriolis force F.

The vibrational gyro 1a is provided with a driving piezoelectric ceramics 4a and a detecting piezoelectric ceramics 4b, and an alternating signal which is an oscillation output of an oscillator 25 is applied to the driving piezoelectric ceramics 4a. In this state, when the vibrational gyro 1a is rotated in θ direction, Coriolis force F is applied to the detecting piezoelectric ceramics 4b to generate a voltage E.

A minute voltage output from the detecting piezoelectric ceramics 4b is amplified by an amplifier 7, and converted to digital data in an A/D converter 10.

The angular velocity ω applied to the vibrational gyro la and the generated voltage E are proportional to each other. For example, the vibrational gyro 1a is arranged so that the voltage E increases when it is rotated clockwisely around the X-axis while the voltage E decreases when it is rotated counterclockwisely.

The vibrational gyros 1b and 1c have basically the same effect as the vibrational gyro 1a. That is, the angular velocity around the Y-axis is detected by the vibrational gyro 1b, and the output thereof is amplified in an amplifier 8, and then converted to digital data in an A/D converter 11. Likewise, the angular velocity around the Z-axis is detected by the vibrational gyro 1c, and the output thereof is amplified in an amplifier 9 and then converted to digital data in an A/D converter 12.

The operation button 2 produces a predetermined signal in accordance with an user's operation, and the signal is supplied to an input interface 13. A CPU 14 (processing means) is connected through a bus 26 to various types of ICs. Not only system programs of the whole device, but also Katakana/Kanji conversion programs for word processor functions and a dictionary table therefor, a recognizing program for a hand-write input and a dictionary table therefor, for example are written in a ROM 15. Data necessary for operations are stored in a RAM 16 at all times.

The LCD 3 is designed to perform a predetermined display under the control of a color LCD controller 18. A pressure-sensitive type transparent tablet 29 detects a predetermined input under the control of a pressure-sensitive type transparent tablet controller 17. A back light 30 irradiates light from the back side through the pressure-sensitive type transparent tablet to the LCD 3 under the control of a back light controller 19.

A PC card interface 20 is provided with a connector 27, and a PCMCIA type GPS card meeting the standards of PCMCIA (Personal Computer Memory Card International Association) as a GPS (Global Positioning System) device (hereinafter merely abbreviated to "GPS card") 22 (position detection means) is inserted. A CPU 14 transmits and received data, programs, etc. to and from the GPS card 22 through the PC card interface 20. Further, the GPS card 22 is connected to a GPS antenna 23 which receives the electric wave from a GPS satellite and outputs the corresponding signal. The GPS card 22 detects the current position on the basis of the signal received by the GPS antenna 23, and outputs the position data corresponding to the current position.

The PC card interface 21 is provided with a connector 28, and it is connected to the PCMCIA type hard disc card (hereinafter merely abbreviated to HDD card) 24 (storage means) as a storage device, for example. Map data, etc. are stored in the HDD card 24.

The input interface 13 supplies through the bus 26 to the CPU 14 a detection signal of the triaxial gyro sensor 1 which is supplied from the A/D converters 10 to 12. Further, it supplies through the bus 26 to the CPU 14 the signal corresponding to a predetermined operation which is supplied from the operation button 2.

Next, the operation when the menu selection is performed by using the PDA 50 thus constructed will be described with reference to FIGS. 3 and 4. When this operation is performed, the data on the current position are not needed, and thus it is unnecessary to insert the GPS card 22 into the connector 27 of the PC card interface 20 in FIG. 2. Further, no map data are needed, and thus it is unnecessary to insert the HDD card 24 into the connector 28.

Figure 3:
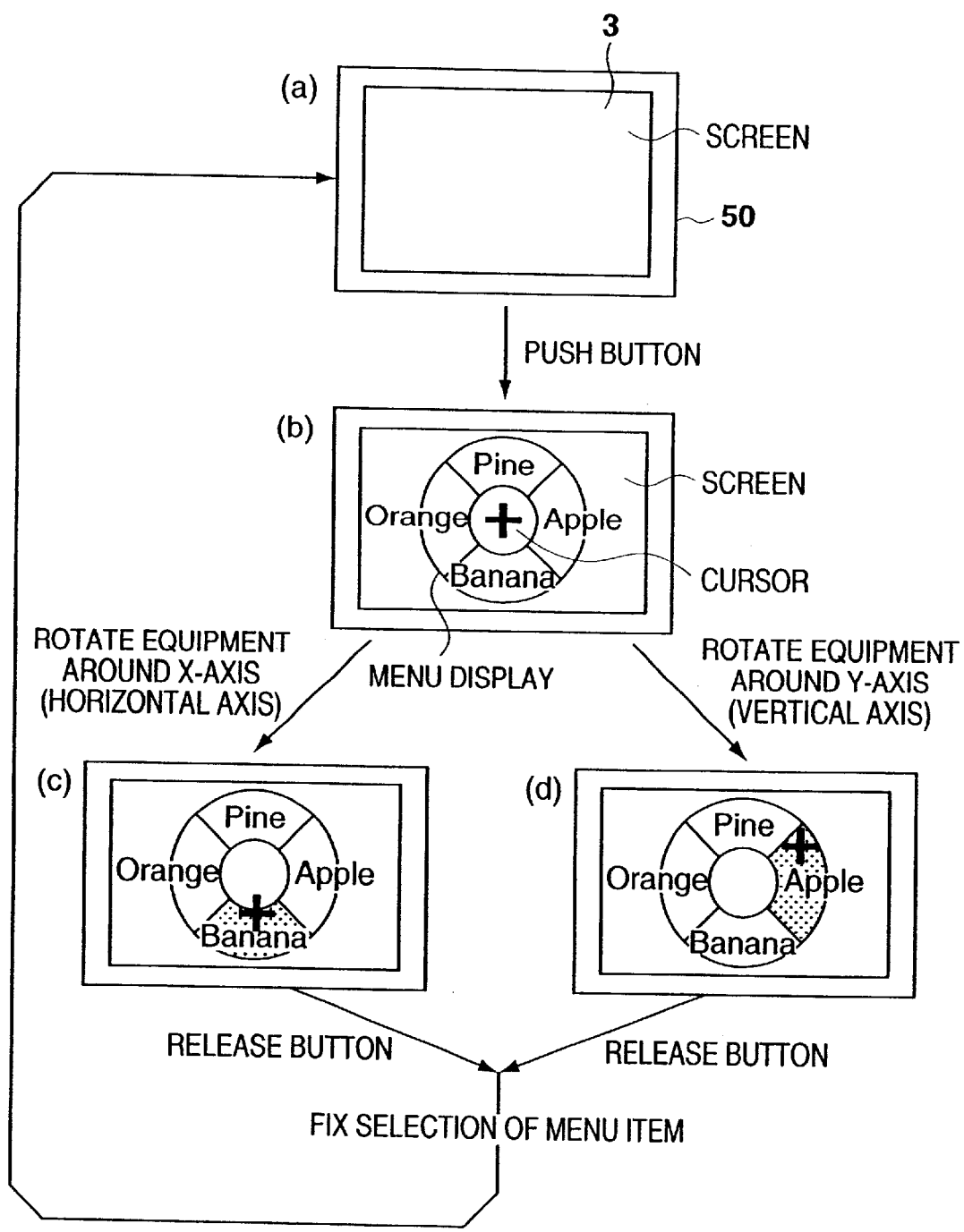
FIG. 3 is a diagram showing a procedure for displaying a ring-shaped menu and selecting a menu item.
Figure 4:
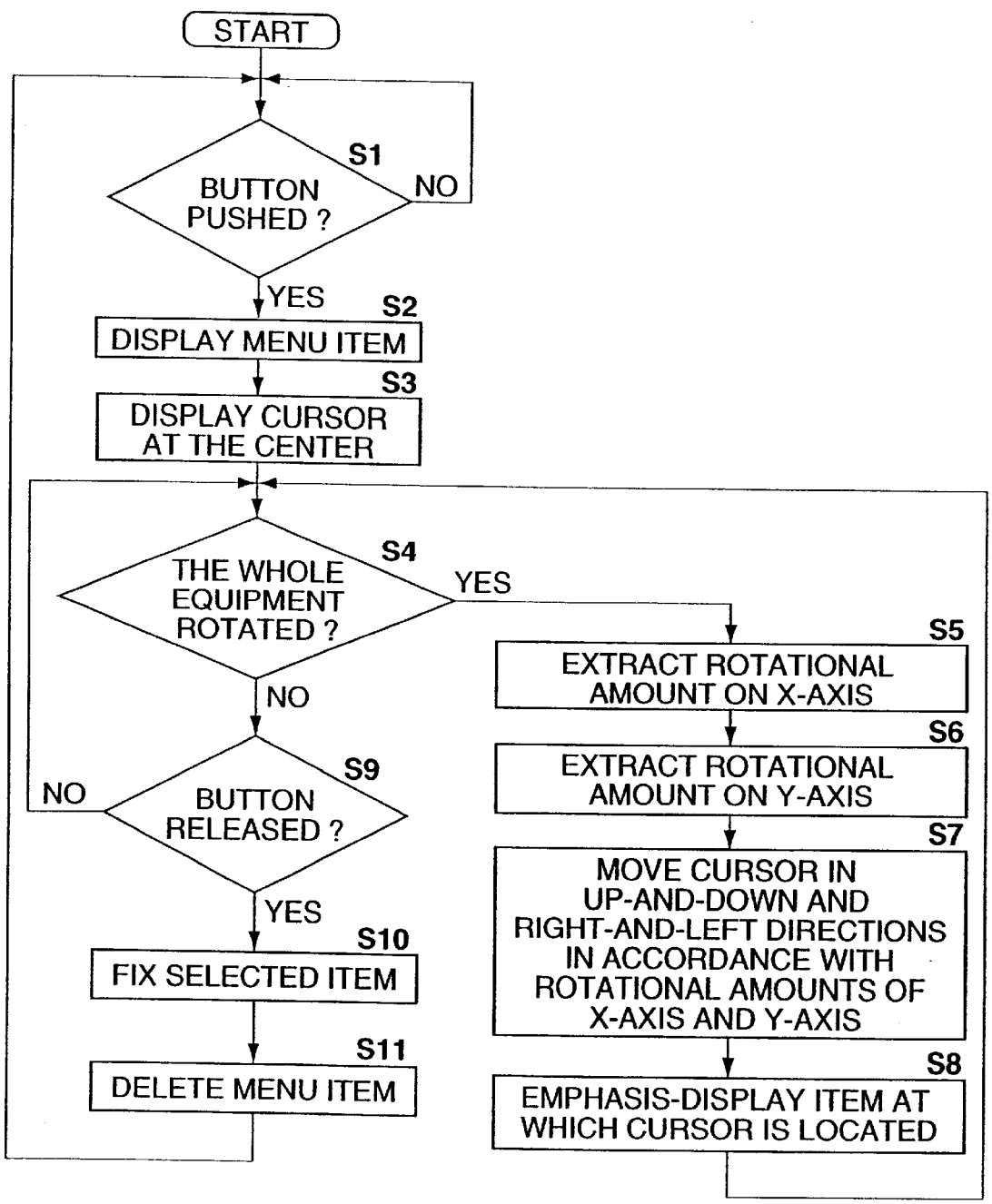
FIG. 4 is a flowchart showing the procedure for selecting a menu item of a ring-shaped menu of FIG. 3.

FIG. 3 shows a series of operation frames when the menu selection is performed, and FIG. 4 is a flowchart showing the operation procedure. First, in step S1 of FIG. 4, the CPU 14 judges whether the operation button 2 is pushed down by a user. At this time, no display is made on the screen of the PDA 50 as shown in (a) of FIG. 3(*a*).

When the operation button 2 is pushed by the user, a predetermined signal is generated, and supplied through the input interface 13 and the bus 26 into the CPU 14, whereby the CPU 14 judges the operation of the button 2, and goes to step S2. On the other hand, when the button 2 is not operated by the user, the processing of the step S1 is repeated.

In step S2 the CPU 14 generates the display data (bit map data) corresponding to a predetermined menu, and supplies the display data through the bus 26 to the color LCD controller 18 together with the data corresponding to a display position on the screen. Alternatively, the bit map data corresponding to the menu may be beforehand stored in the ROM 15, and then read out through the bus 26 and supplied to the color LCD controller 18.

The color LCD controller 18 has a VRAM (video RAM) not shown, and controls the LCD 3 according to the data written in the VRAM to display a predetermined image. Accordingly, the display data corresponding to the predetermined menu which is supplied from the CPU 14 are stored in the VRAM of the color LCD controller. The color LCD controller 18 supplies a control signal to the LCD 3 in accordance with the display data stored in the VRAM to thereby display the predetermined menu.

Next, in step S3, for example, the CPU 14 reads out the display data corresponding to a predetermined cursor from the ROM 15 and supplies the display data to the color LCD controller 18 together with the data corresponding to the display position on the screen. The color LCD controller 18 stores into the VRAM the display data corresponding to the cursor supplied from the CPU 14, and controls the LCD 3 in accordance with the display data stored in the VRAM.

As a result, as shown in (b) of FIG. 3, a predetermined menu and a predetermined cursor (in this case, it has a cross shape) are displayed on the screen of the LCD 3. In this case, the cursor is first displayed on the center of the menu.

Next, the process goes to step S4, and the CPU 14 judges whether the whole equipment (PDA) 50 is rotated. For example, when the user rotates the whole equipment around the X-axis while held by one hand as shown in FIG. 1, a predetermined voltage is generated in the detecting piezo-electric ceramics 4b due to the rotation, and it is amplified in the amplifier 7 and converted to digital data in the A/D converter 10. The digital data are input through the input interface 13 and supplied through the bus 26 to the CPU 14, whereby the CPU 14 can recognize the rotation of the whole equipment around the X-axis. The same is satisfied for the rotation around the Y-axis and the rotation around the Z-axis.

In step S4, when it is judged that the whole equipment is rotated, the CPU 14 goes to step S5 to extract the rotational amount on the X-axis. In step S7, the cursor is moved in upward and down directions and in the right and left directions in accordance with the respective rotational amounts of the X-axis and the Y-axis in step S6.

That is, in order to move the cursor in the upward and downward directions and the right and left directions in accordance with the rotation of the whole equipment, the bit map data corresponding to the cursor and the data corresponding to the display position to which the cursor currently displayed on the screen is displaced in the upward and downward directions and the right and left directions, are supplied to the color LCD controller 18. The magnitude of the displacement of the display position corresponds to each output voltage of the detecting piezoelectric ceramics 4b, 5b. The color LCD controller 18 stores the bit map data supplied from the CPU into a predetermined place of the VRAM on the basis of the data corresponding to the display position.

The color LCD controller 18 controls the LCD 3 in accordance with the bit map data corresponding to the cursor after moved, which are stored in the VRAM. With this operation, when the whole equipment is rotated around the X-axis in such a state that the cursor is first located at the center of the screen as shown in (b) of FIG. 3, the cursor is moved to an item "Banana" as shown in (c) of FIG. 3, for example. Further, when the whole equipment is rotated around the Y-axis in such a state that the cursor is first located at the center of the screen as shown in (b) of FIG. 3, the cursor is moved to an item "Apple" as shown in (d) of FIG. 3, for example.

Next, the CPU 14 goes to step 8. When the cursor is located at any one of the menu items, the CPU 14 generates the display data corresponding to the menu for which the display of the menu item is emphasized, and supplies the display data to the color LCD controller 18. For example, when the cursor is located at the menu item "Banana" as shown in (c) of FIG. 3, the CPU 14 generates display data corresponding to the menu for which the menu item "Banana" is displayed while emphasized, and supplies the display data to the color LCD controller 18.

With this operation, the color LCD controller 18 stores into the VRAM the display data corresponding to the menu for which the display of the menu item "Banana" at which the cursor is located is emphasized. In accordance with the display data stored in the VRAM, the color LCD controller 18 controls the LCD 3, and displays the frame in which the menu item "Banana" is emphasis-displayed.

For example, when the cursor is located at the menu item "Apple" as shown in (d) of FIG. 3, the display data corresponding to the menu for which the menu item "Apple" is emphasis-displayed are generated, and supplied to the color LCD controller 18.

With this operation, the color LCD controller 18 stores in the VRAM the display data corresponding to the menu for which the menu item "Apple" at which the cursor is located is emphasis-displayed. In accordance with the display data stored in the VRAM, the color LCD controller 18 controls the LCD 3 to display e frame in which the menu item "Apple" is emphasis-displayed.

When the processing in step S8 is finished, the CPU 14 returns to step S4 to repeat the processing subsequent to the step S4.

When it is judged in step S4 that the whole equipment is not rotated, the CPU 14 goes to step S9 to judge whether the operation button 2 is released. If it is judged that the operation button 2 is not released, the CPU returns to the step S4 to repeat the processing subsequent to the step S4. On the other hand, when the operation button 2 is released in such a state that such a frame as shown in (d) FIG. 4 is displayed, it is judged in step S9 that the operation button 2 is released, and the CPU goes to step S10 to fix the selection of the emphasis-displayed menu item.

With this operation, in step S11 the menu is deleted from the screen, and the CPU returns to the step S1 to repeat the processing subsequent to the step S1.

By holding the whole device with one hand and rotating it around the X-axis and the Y-axis as described above, a prescribed menu item can be selected. In the foregoing description, there is described the case where the rotation around the two axes of the X-axis and the Y-axis. However, it is needless to say that the selection of the menu item can be performed by rotating the whole device around the three axes of the X-axis, the Y-axis and the Z-axis.

Figure 5:
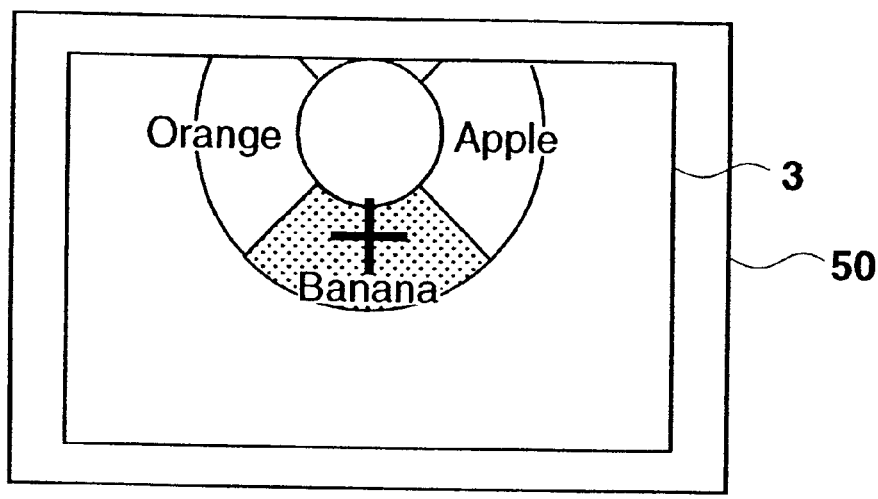
FIG. 5 is a diagram showing a menu frame in which a cursor is fixed and a ring-shaped menu is moved.

Further, in this embodiment, when the device is rotated, the cursor is moved on the menu to select a prescribed menu item. However, it may be adopted that the cursor is fixed at a predetermined position, for example, at the center as shown in FIG. 5, and the menu is moved within the frame when the device is rotated. With this operation, a prescribed menu item can be also selected.

Figure 6:
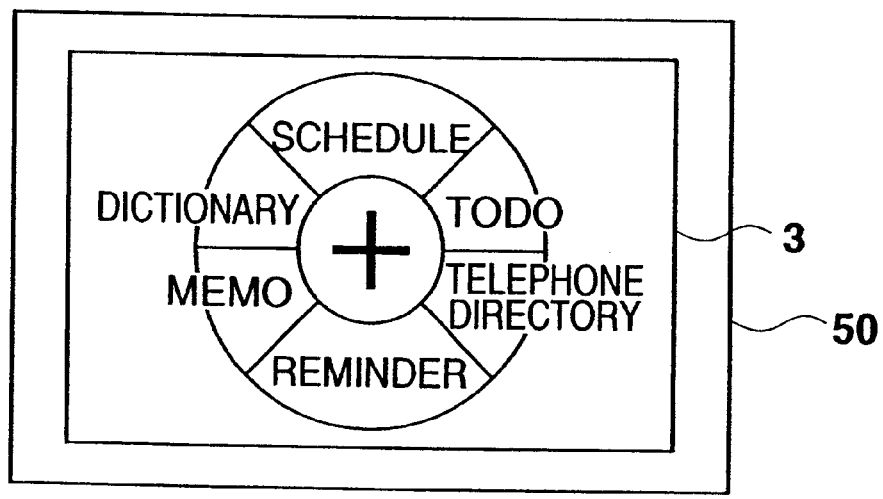
FIG. 6 is a diagram showing a menu frame which is displayed in an electronic notebook.

FIG. 6 shows a display example of the LCD 3 when the present invention is applied to the electronic notebook. For example, the electronic notebook is held by one hand, and a ring-shaped menu is displayed by pushing down the operation button 2. In this case, the menu items used in the electronic notebook, for example, "schedule", "dictionary", "memo", "reminder", "telephone directory", "TODO (matters to be done)", etc. are displayed, for example, and the cursor is displayed at the center of the screen.

Subsequently, by rotating the whole electronic notebook around the X-axis and the Y-axis while pushing the operation button 2, the cursor is moved to a prescribed menu item. Subsequently, when the operation button 2 is released while the cursor is located at a desired menu item, the selection of the menu item at which the cursor is located is fixed.

As described above, the electronic notebook can be operated by one hand to select the menu item. Further, in place of the above menu, a menu containing numerals, alphabets, Hiragana or Katakana or the like as menu items may be displayed, and a telephone number, a sentence, or the like may be input by selecting a desired numeral or character with the cursor.

Figure 7:
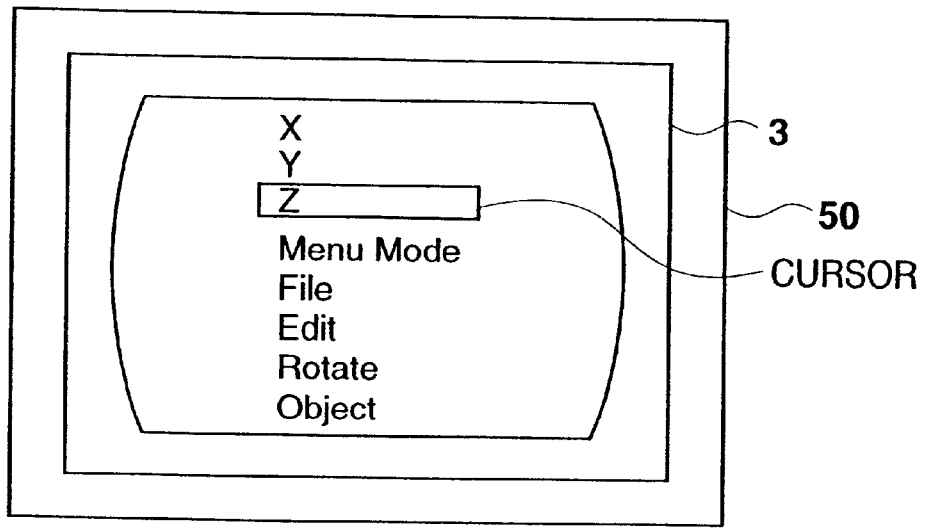
FIG. 7 is a diagram showing a state in which a ring-shaped menu is displayed and a menu item is selected.

FIG. 7 shows an example of a drum-shaped menu. Menu items are displayed as if they are arranged on a drum, and a rectangular cursor is displayed on a predetermined position. First, a user pushes the operation button 2, and then rotates the device around the X-axis, whereby the drum is rotated. When a desired menu is moved to the inside of the cursor, the operation button 2 is released. As described above, a desired menu item of the drum-shaped menu can be selected and fixe.

Next, the case where a digital map is displayed by using the PDA 50 thus constructed will be described with reference to FIGS. 8 to 13. When this display is carried out, data on the current position are needed, and thus the GPS card 22 is inserted into the connector 27 of the PC card interface 20 in FIG. 2, whereby the current position can be calculated on the basis of the electric wave from the GPS satellite which is received by the GPS antenna 23. Further, the HDD card 24 is inserted into the connector 28 to allow map data to be read out.

Figure 8:
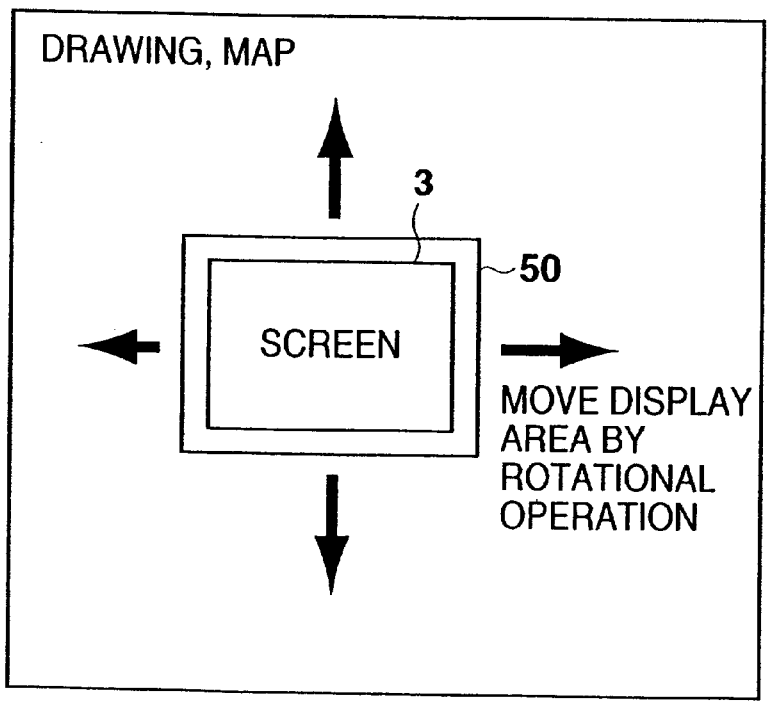
FIG. 8 is a diagram showing a movement on a virtual map and display of any portion on a map on a screen.

FIG. 8 is a conceptual diagram showing that a prescribed area such as a virtual map, a drawing or the like is displayed on the screen by applying a rotational operation on the PDA 50. In the PDA 50, the map data are stored in the HDD card 24, and the CPU 14 reads out the map data through the PC card interface 21 from the HDD card 24. The read-out map data is subjected to coordinate conversion processing to perform a bird's eye view map display which will be described later with reference to FIGS. 14 to 16, thereby generating the bit map data corresponding to the map data which have been subjected to the coordinate conversion processing, and then the bit map data are supplied to the color LCD controller 18.

The color LCD controller 18 stores the bit map data supplied from the CPU 14 into the VRAM. The color LCD controller 18 controls the LCD 3 on the basis of the bit map data stored in the VRAM, and displays the map corresponding to the bit map data. As described above, the area corresponding to the current position in a prescribed map can be displayed. In this case, the map data corresponding to the current position which is supplied from the GPS card 22 are read out from the HDD card 24, and displayed by the LCD 31.

For example, when the user pushes the operation button 2 and the PDA 50 is rotated around the horizontal axis (X-axis) to the screen while the map of the current position is displayed on the screen of the PDA 50, a prescribed voltage is generated in the detecting piezoelectric ceramics 4b. The voltage is amplified by the amplifier 7, and converted to digital data in the A/D converter 10. Thereafter, the digital data are supplied through the bus 26 into the CPU 14, whereby the CPU 14 recognizes that the PDA 50 is rotated around the X-axis.

Subsequently, bit map data corresponding to map data which are displaced upwardly or downwardly from a portion currently-displayed on the screen of the LCD 3 are generated on the basis of the map data read out from the HDD card 24 so that the map displayed on the LCD 3 is moved upwardly or downwardly, and then supplied to the color LCD controller 18.

The color LCD controller 18 temporarily stores into the VRAM the bit map data supplied from the CPU 14. Subsequently, it controls the LCD 3 in accordance with the bit map data stored in the VRAM to display the corresponding map, whereby the map displayed on the screen of the LCD 3 of the PDA 50 is moved upwardly and downwardly in accordance with the rotational operation by the user. The movement amount corresponds to the rotational angle of the PDA 50.

Further, when the PDA 50 is rotated around the axis (Y-axis) perpendicular to the screen while the operation button 2 is pushed, a voltage is generated by the detecting piezoelectric ceramics 5b at this time, and thus the CPU 14 recognizes that the rotational operation around the Y-axis is performed.

Subsequently, on the basis of the map data read out from the HDD card 24, the CPU 14 generates the bit map data corresponding to the map data which is displaced in the left or right direction from a portion currently-displayed on the LCD 3 so that the map displayed on the LCD 3 is moved in the left direction or the right direction, and supplies the data to the color LCD controller 18.

The color LCD controller 18 temporarily stores the bit map data supplied from the CPU 14 into the VRAM. Subsequently, in accordance with the bit map data stored in the VRAM, the color LCD controller 18 controls the LCD 3 to display the corresponding map. Accordingly, the map displayed on the screen of the LCD 3 of the PDA 50 is moved in the right and left direction in accordance with the rotating operation of the user. The movement amount corresponds to the rotational angle of the PDA 50.

Further, by combining the above rotating operation, any portion of the map can be displayed on the screen of the LCD 3. When the operation button 2 is released (cancel) in a state that a predetermined area of the map is displayed as described above, the map of the area which is current displayed is fixed, and the map of the portion is displayed on the screen continuously subsequently. The rotating operation around the X-axis and the rotating operation around the Y-axis can be performed at the same time.

Figure 9:
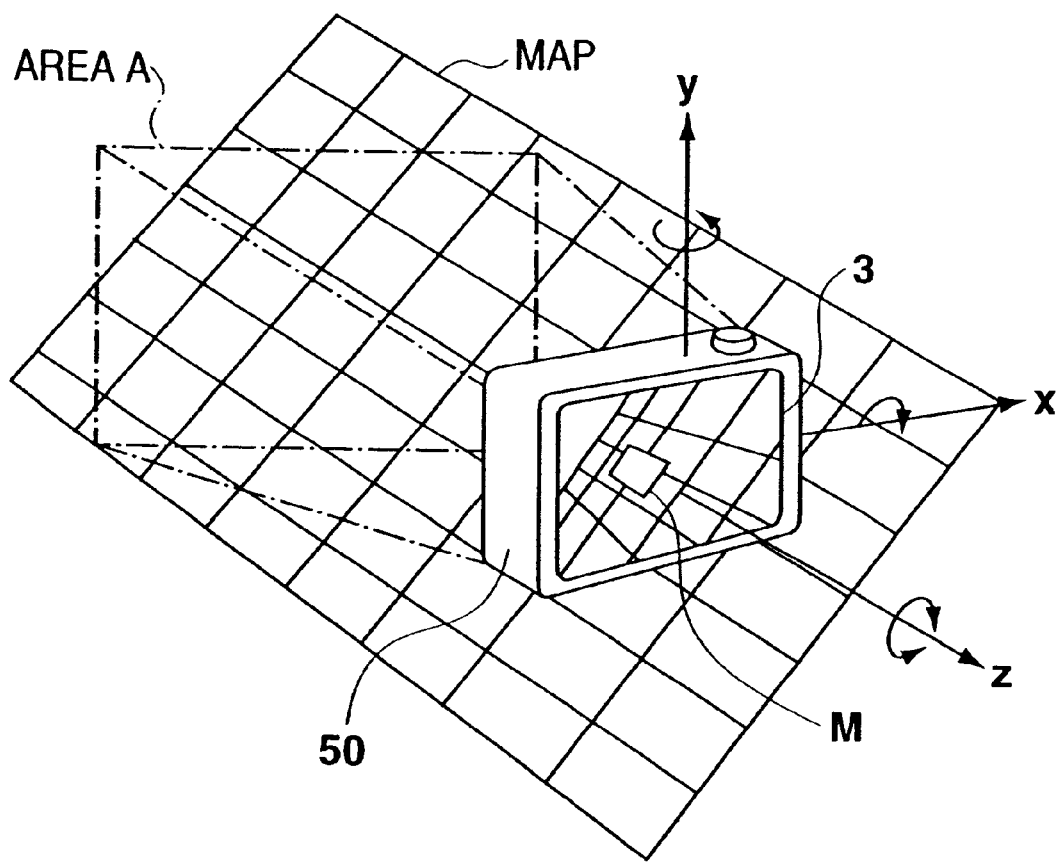
FIG. 9 is a diagram showing the state that a virtual map is viewed obliquely from the sky.
Figure 10:
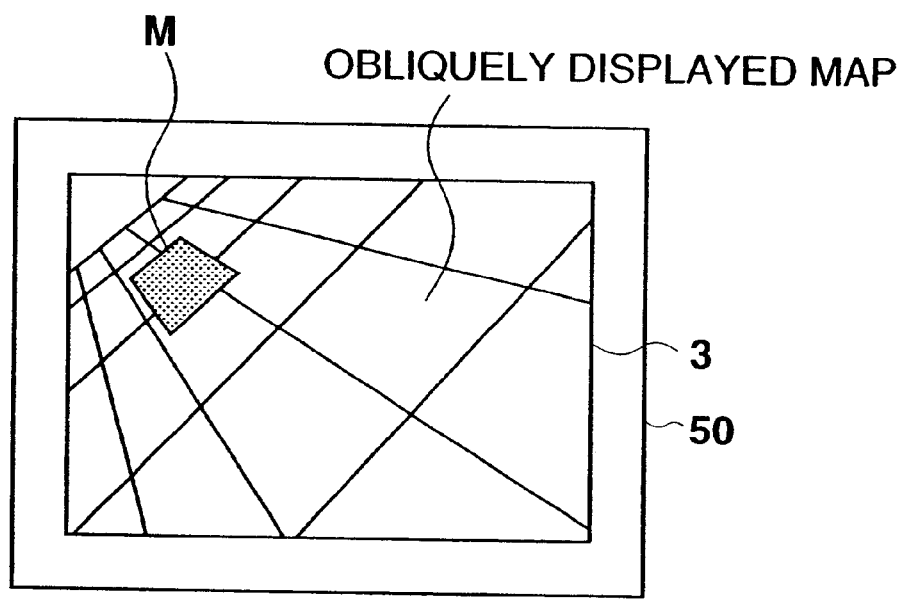
FIG. 10 is a diagram showing a frame which is displayed on the LCD 3 of the PDA 50 in FIG. 9.

FIG. 9 shows a state that the PDA 50 is located in a slant position to a virtual map. When viewing the virtual map which is located at the back surface of the screen of the LCD 3 from the direction (Z-axis direction) perpendicular to the screen of the LCD 3 of the PDA 50, an area A on the map can be observed. Therefore, a map as shown in FIG. 10 is displayed on the LCD 3 of the PDA 50. Accordingly, such an image as if the map is actually broadened and it is viewed from various angles can be displayed on the screen.

Further, an index M which represents a next moving destination M can be displayed as shown in FIGS. 9 and 10. Accordingly, the user can recognizes the place on the map to which the user moves, and thus the operation when the user moves to a desired portion on the map can be facilitated. Further, even when the moving destination is far away, the current display area and the moving destination can be displayed on the screen at the same time, so that the relationship between the moving destination and the current position can be easily recognized.

Figure 11:
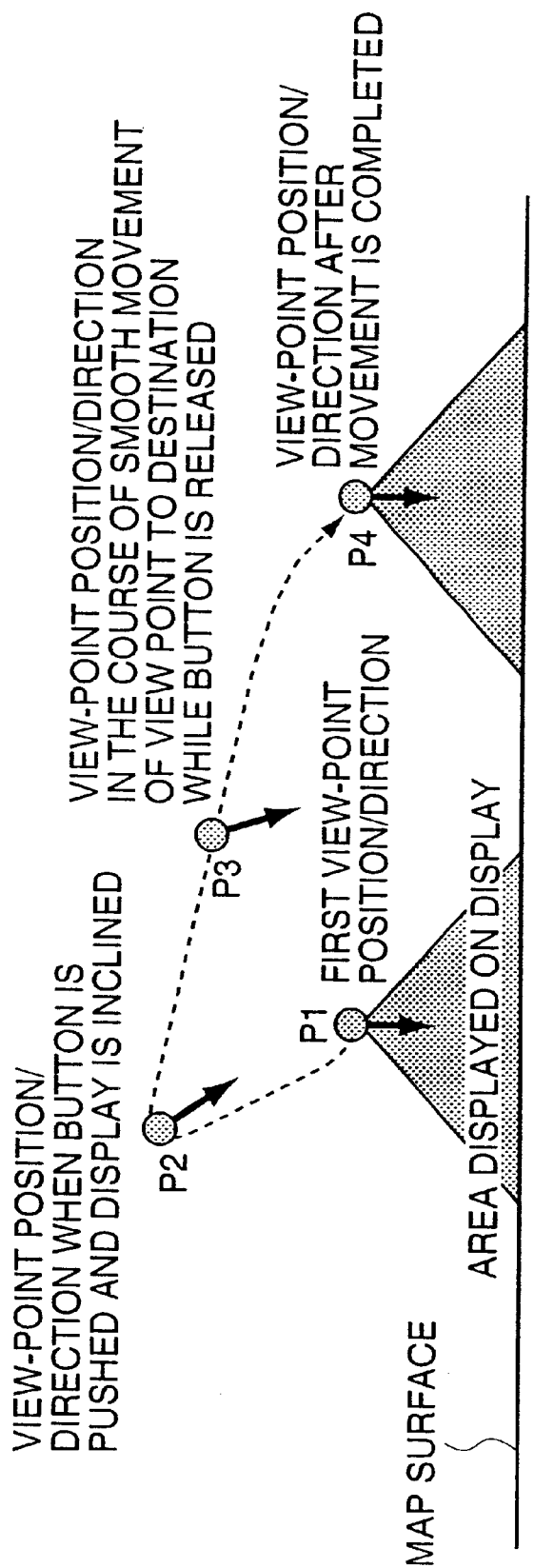
FIG. 11 is a diagram showing the locus of a view point which is viewed from the lateral direction of a virtual map when the view point is moved from the current position to the moving destination on the virtual map.
Figure 12:
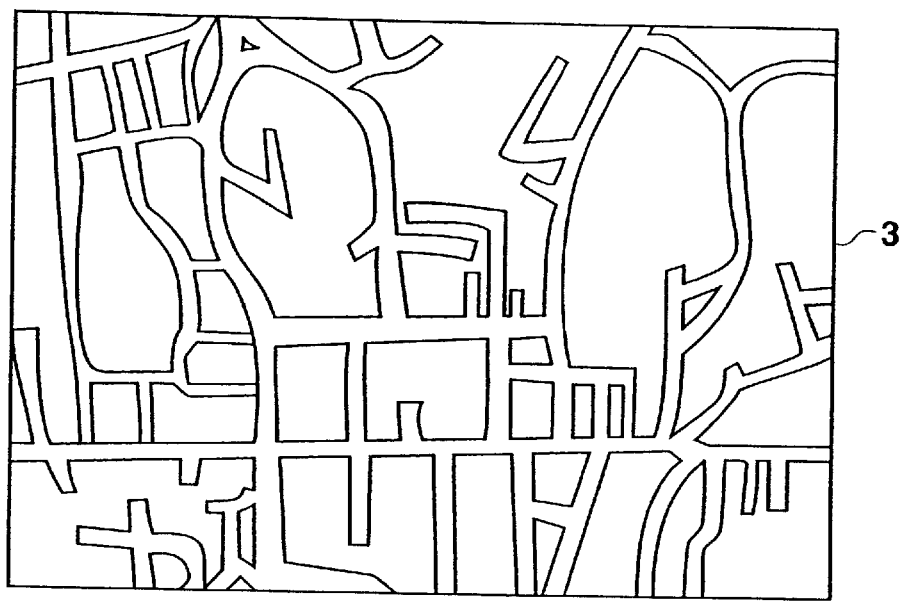
FIG. 12 is a frame display when the map is viewed at a view point P1 in FIG. 11.

FIG. 11 is a diagram showing the locus of the PDA 50 moving on the virtual map, which is viewed from the lateral direction of the surface of the map. First, the map is viewed from the top at a view point P1, and a map as shown in FIG. 12 is displayed on the screen of the LCD 3. Subsequently, the operation button 2 of the PDA 50 is pushed, and the PDA 50 is rotated around a predetermined axis, whereby the view point is automatically moved from the view point P1 to a view point P2 which is located at the upper side of the view point P1, and the map can be viewed from an obliquely upper side.

At this time, the whole or part of the area on the map which is viewed at the view point P1 can be located within the screen of the PDA 50. Accordingly, the positional relationship between the current position and the moving destination can be easily grasped, and a desired moving destination can be quickly found out.

Figure 13:
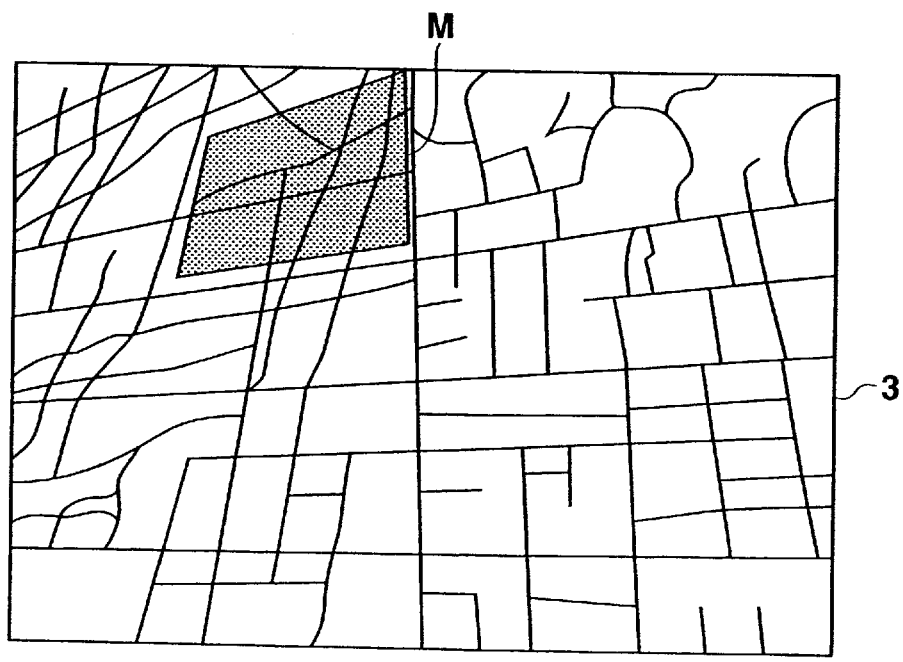
FIG. 13 is a frame display when the map is viewed at a view point P2 in FIG. 11.

At the view point P2, such a bird's eye view as obtained by viewing the virtual map from the obliquely upper side is displayed on the screen of the LCD 3 of the PDA 50 as shown in FIG. 13, and the index M of the moving destination is displayed. When the operation button 2 is released at the time when the index M is coincident with a desired moving destination, the view point is moved from the view point P2 through the view point P3 to the view point P4. The image obtained by viewing the map from the top at the view point P4 is displayed on the LCD 3 of the PDA 50.

As described above, the user can easily display a desired place on the map by operating the PDA 50 with one hand.

Next, a bird's eye view display method will be described with reference to FIGS. 14 to 16. This is the method for displaying a map as if it is viewed from the sky, and it has been recently used for a navigation device, etc. to display the detailed condition of roads around a display fiducial point at which the vehicle is located, and also display the condition of far roads.

Figure 14:
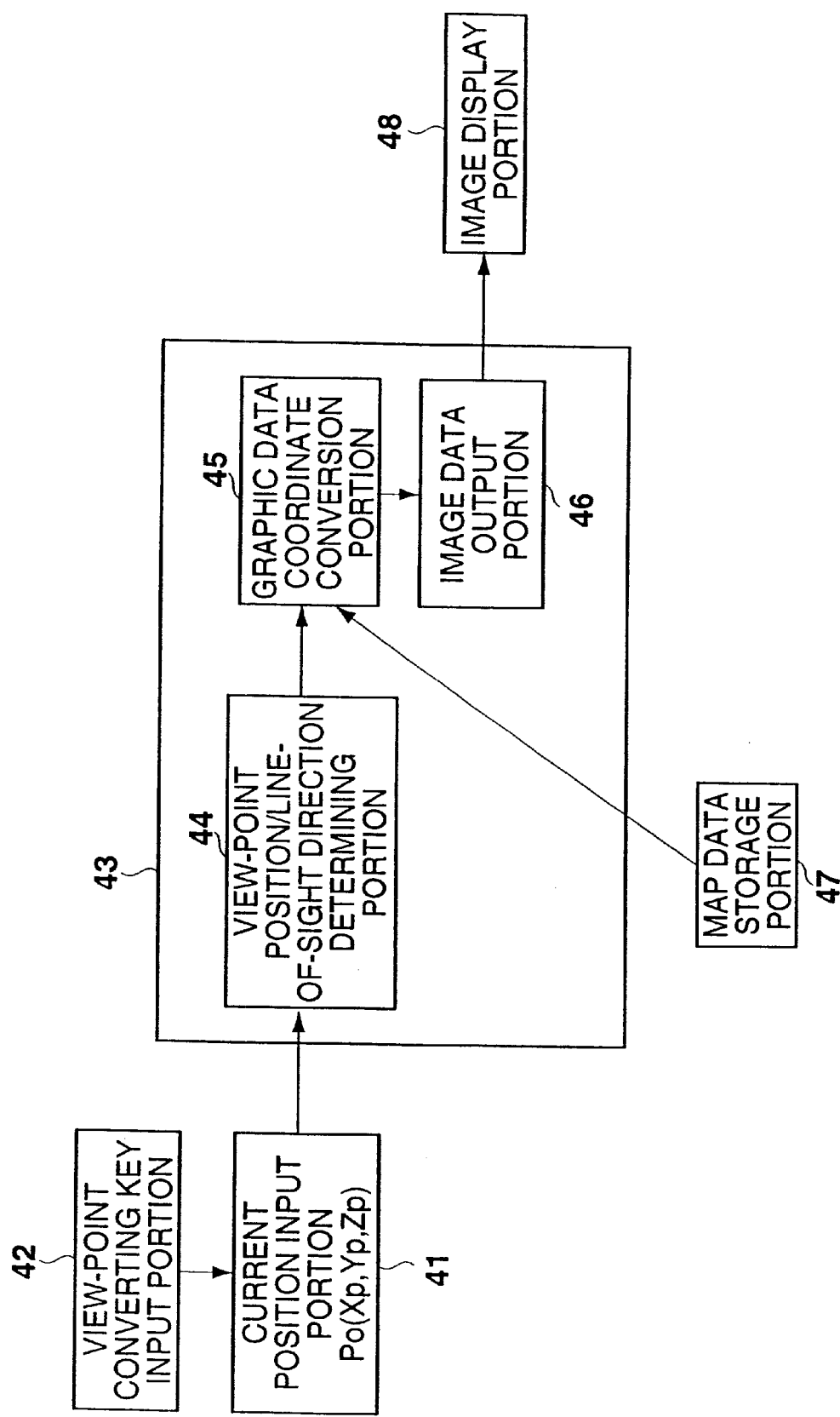
FIG. 14 is a block diagram showing the general construction of a system for performing bird's eye view display processing.

FIG. 14 shows the construction of a general system which implements the bird's eye view display. The system comprises a current position input portion 41 for inputting the current position $P_0$ ($X_p$, $Y_p$, $Z_p$), a view-point converting key input portion 42 for changing the current position, a bird's eye view display calculation portion 43 which comprises a view-point position/line-of-sight direction determining portion 44 for determining the view-point position/line-of-sight direction on the basis of information from the current position input portion 41, a graphic data coordinate converting portion 45 for converting the coordinate of graphic data on the basis of the information from the view-point position/line-of-sight direction determining portion 44 and the map information, and an image data output portion 46 for outputting image data on the basis of the information from the graphic data coordinate converting portion 45, a map data storage portion 47 for storing each type map information and outputting the stored map information to the graphic data coordinate converting portion 45, and an image display portion 48 for displaying the image corresponding to the image information output from the image data output portion 46.

This system can be implemented by mounting the GPS card 22 in the PDA 50 shown in FIG. 2. That is, the current position input portion 41 corresponds to the GPS card 22, the GPS antenna 23, and the view-point converting key input portion 42 corresponds to the triaxial gyro sensor 1. The view-point position/line-in-sight direction determining portion 44 and the graphic data coordinate conversion portion 45 which constitute the bird's eye view display calculation portion 43 correspond to the CPU 14, and the image data output portion 46 corresponds to the color LCD controller 18. The map data storage portion 47 corresponds to the HDD card 24, and the image display portion 48 corresponds to the LCD 3.

Figure 15:
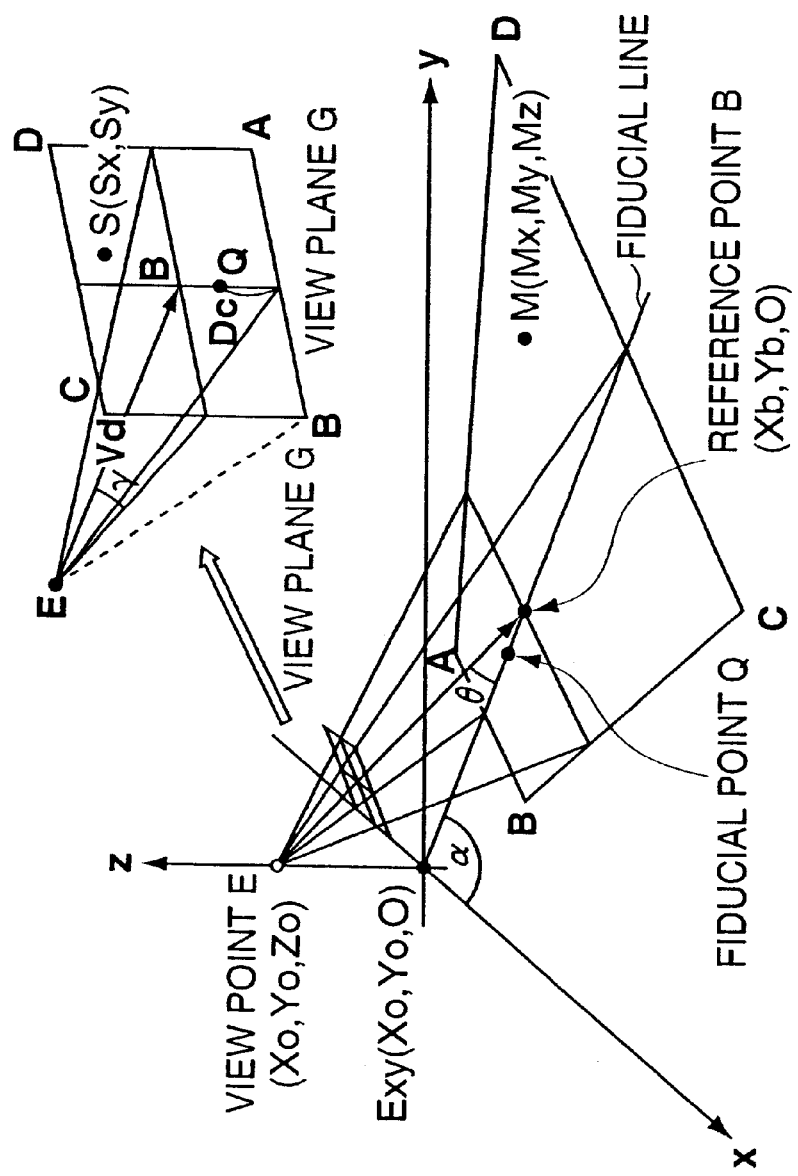
FIG. 15 is a diagram showing the concept of the perspective projection conversion.

As shown in FIG. 15, a map ABCD area which is represented with respect to the XY plane of the XYZ plane is downwardly viewed from a view point E($X_0$, $Y_0$, $Z_0$) to a reference point B ($X_b$, $Y_b$, $Z_b$) by an angle of depression θ to obtain a picture, and then the picture is projected onto a view plane G disposed vertically to the line-of-sight direction. A perspective projection view is obtained by displaying the above projected picture as a bird's eye view on the screen.

In this case, it is assumed that the line-of-sight from the view point E has rotational direction information angle α to the XY plane. The distance between the view point E and the view plane G is represented by $V_d$. On the perspectively-projected display image, a longitudinal line on the center line is set as a reference line, and a point Q which is fixed on the reference line is referred to as a fiducial point of the perspective projection. The fiducial point Q is located on a line connecting the view point E which is assumed as locating on the XY plane and the reference point B (the center on the screen) of the perspective projection, and it is displayed at the distance $D_c$ from the lower side of the display frame toward the reference point B.

Figure 16:
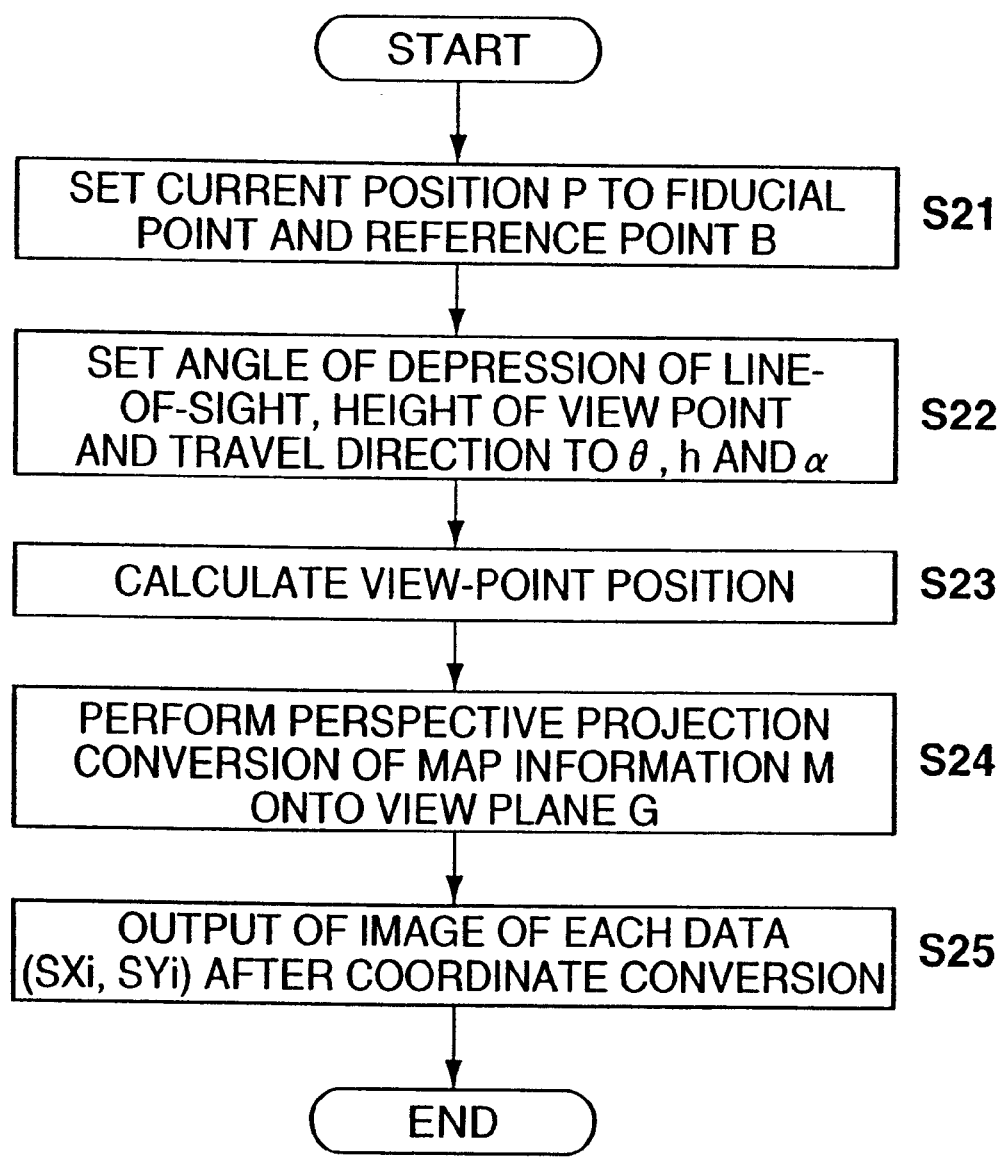
FIG. 16 is a flowchart showing the operation of the system shown in FIG. 14.

FIG. 16 is a flowchart showing the processing operation of the system shown in FIG. 14. This processing is implemented by the calculation of a general computer, and has a method of setting the current position $P_0$ as the view-point position E, and a method of setting the current position $P_0$ as the reference point Q of the perspective projection. In this case, there will be described the case where the current position $P_0$ is set as the fiducial point Q, and the fiducial point Q is coincident with the reference point B.

First, by the view-point converting key input portion 42 and the current position input portion 41, in step S1 the current position $P_0$ is set as the fiducial point and the reference point B, and in step S22 the angle of depression of line-of-sight, the height of the view point and the travel direction are set to θ, h and α respectively.

Subsequently, the CPU 14 goes to step S23, and the view-point position is calculated from the following equation by the view-point position/line-of-sight direction determining portion 44. In this case, the view-point E can be determined on the basis of the information of the reference point B as follows. That is, assuming that the coordinate of the reference point B is set to (x, y, 0), the view point E ($X_0$, $Y_0$ and $Z_0$) can be represented as follows.

$X_0 = x - h \times \cos \alpha(t)/\tan \theta$ $Y_0 = y - h \times \sin \alpha(t)/\tan \theta$ $Z_0 = h$ Subsequently, in step S24, the perspective projection is performed on the map data on the basis of the calculated view point by the graphic data coordinate converting portion 45. In this case, the relational expression of the coordinate conversion of the point M ($M_x$, $M_y$, $M_z$) on the XY plane onto the view plane G ($S_x$, $S_y$) is represented as follows. In the case of a plan map, $M_z$ is equal to zero.

[Equation 1]

When $$\begin{pmatrix} E_x \\ E_y \\ E_z \\ 1 \end{pmatrix} = \begin{pmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{pmatrix} \begin{pmatrix} \sin\alpha(t) & -\cos\alpha(t) & 0 & 0 \\ \cos\alpha(t) & \sin\alpha(t) & 0 & 0 \\ 0 & 0 & 1 & 0 \\ 0 & 0 & 0 & 1 \end{pmatrix}$$

$$\begin{pmatrix} 1 & 0 & 0 & -X_0 \\ 0 & 1 & 0 & -Y_0 \\ 0 & 0 & 1 & -Z_0 \\ 0 & 0 & 0 & 1 \end{pmatrix} \begin{pmatrix} M_x \\ M_y \\ M_z \\ 1 \end{pmatrix}$$

$S_x = E_x \times V_d / -E_z$ $S_y = E_y \times V_d / -E_z$ $S_z = 0$

Subsequently, in step S25, the image data output portion 46 supplies each data (Sxi, Syi) after the coordinate conversion to the image display portion 48, the image display portion 48 displays the image corresponding to the data supplied from the image data output portion 46, and the processing is ended, whereby the map data which are represented with respect to the XY plane are perspectively projected onto the view plane G, and the bird's eye view is displayed.

In the above-described embodiment, a button for virtually advancing or moving backward may be separately provided, whereby a map can be viewed from any height.

In the above-described embodiment, the PCMCIA type HDD card is used as the storage device for storing information. However, a semiconductor memory or other storage devices may be used.

Further, the cursor and the menu may be moved by using an angle sensor for detecting the rotational angle only around the X-axis or the rotational angles around the X-axis and the Y-axis.

According to the information processing device as claimed in claim 1 and the information processing method as claimed in claim 11, the displacement of the attitude of the housing due to the rotation of the whole housing is detected, selection information corresponding to the detected displacement is displayed in accordance with the operation by the instructing means, and when desired information is selected from the selection information which is indicated by the operation of the indicating means, the processing which is associated with the selected selection information is performed. Therefore, the information can be input by the rotational operation of the whole housing, so that the information can be input by one hand and the number of buttons can be reduced. Accordingly, the operability of the portable type equipment can be enhanced, and the equipment can be miniaturized.

What is claimed is:

1. A portable graphical view production system comprising:
    a housing including an image display;
    a location input device mounted in the housing for inputting a current location of the system;
    a viewpoint position/line-of-sight direction determination means mounted in the housing for determining a viewpoint position and line-of-sight direction, said viewpoint position/line-of-sight direction determination means including an angular velocity sensor which detects changes in the angular velocity of the system;
    a map data storage device mounted in the housing for providing map data corresponding to said current location of the system; and
    a graphic data coordinate conversion means mounted in the housing for converting said map data on the basis of said current location, said viewpoint position line-of-sight direction and changes in the angular velocity wherein the converted map data is displayed by the image display.

2. The portable graphical view production system of claim 1 wherein the location in put device is a global positioning system.

3. The portable graphical view production system of claim 1 wherein the map data storage device comprises a removable HDD card.

4. The portable graphical view production system of claim 1 further comprising a viewpoint converting input portion for changing the viewpoint and line of sight determined by said viewpoint/line-of-sight direction determination means.

5. The portable graphical view production system of claim 4 wherein said viewpoint converting input portion includes a manually actuated switch adapted to provide a signal to the graphic data coordinate conversion means when the switch is actuated.

6. The portable graphical view production system of claim 1 wherein said angular velocity sensor is a gyroscopic sensor.

7. The portable graphical view production system of claim 4 wherein the viewpoint position/line of sight direction determination means and the graphic coordinate conversion means comprise a microprocessor adapted to determine a viewpoint position based on the current location and an output from the viewpoint converting input portion.

8. The portable graphical view production system of claim 7 wherein the system is housed in a hand held device configured to be operated by a single hand.

9. The portable graphical view production system of claim 1 wherein the converted map data displayed by the image display is displayed as a perspective view of a map based on the viewpoint selected and the line of site.

10. The portable graphical view production system of claim 9 further comprising a viewpoint changing means for changing the selected viewpoint.

11. The portable graphical view production system of claim 10 wherein viewpoint height is changed in response to said viewpoint changing means.

12. The portable graphical view production system of claim 1 wherein said converted map data is projected onto the image display such that the image display is perpendicular to the line of sight.

13. The portable graphical view production system of claim 1 wherein said image display further displays an index for identifying a destination location.

* * * * *